United States Patent [19]
Chan et al.

[11] Patent Number: 5,644,451
[45] Date of Patent: Jul. 1, 1997

[54] MECHANISM FOR LOADING AND UNLOADING OF READ/WRITE HEADS AT AN INNER DIAMETER OF A DISK

[75] Inventors: John R. Chan, Fremont; Jeffrey R. Burt, Mountain View, both of Calif.

[73] Assignee: Samsung Information Systems America, Inc., Santa Clara County, Calif.

[21] Appl. No.: 451,632

[22] Filed: May 26, 1995

[51] Int. Cl.$^6$ ........................................... G11B 5/54
[52] U.S. Cl. .................................................. 360/105
[58] Field of Search ........................................ 360/105

[56]         References Cited
             U.S. PATENT DOCUMENTS 3,984,873  10/1976  Pejcha .................... 360/105
4,752,848   6/1988  Garcia .................... 360/105
5,574,604  11/1996  Berg ...................... 360/105

*Primary Examiner*—A. J. Heinz
*Attorney, Agent, or Firm*—Skjerven, Morrill, MacPherson, Franklin & Friel; David T. Millers

[57]            ABSTRACT

Mechanisms for loading and unloading heads on surfaces of disks in a disk drive provide ramps attached to central portions of the disks. The ramps are integral parts of spacers between disks or spacers or disk clamps at the top or bottom of a stack of disks. Each head assembly has a suspension arm that engages a corresponding ramp to lift a read/write head away from a surface of a disk. Heads land (or return to the surfaces of the disks) in landing zones at inner diameters of the disks and do not damage data because the loading zones contain no data storage. Alignment of the ramps with the disks is automatic because ramps directly attach to the disks.

17 Claims, 5 Drawing Sheets

MECHANISM FOR LOADING AND UNLOADING OF READ/WRITE HEADS AT AN INNER DIAMETER OF A DISK

BACKGROUND OF THE INVENTION

1. Field of the Invention

This invention relates to mechanisms for loading and unloading read/write heads on disks in disk drives.

2. Description of Related Art

Read/write heads in disk drives read or write data by sensing or setting the magnetization of areas on rotating disks. Placing a head closer to a disk during reading and writing reduces the amount of disk area that interacts with the head. This increases data density by reducing the size of the smallest readable and writable areas. Accordingly, in some disk drives, heads fly less than a micron above (or even drag on) the surfaces of rotating disks. This requires that disk and head surfaces be extremely smooth.

A problem with close contact of smooth surfaces is a stiction force that arises because smooth surfaces tend to adhere to each other. The stiction force can cause disk wear which leads to data loss and loss of usable storage area. The stiction force also places drag on a disk drive motor during spin up (acceleration of the disk) which increases necessary start-up torque and can cause spin up failure.

To reduce stiction, some disk drives have stationary loading-unloading mechanisms near the outer edges of disks in the drive. Each loading-unloading mechanism unloads a head by lifting the head away from the surface of a disk, so that the head is away from the disk and does not stick to the disk. Accordingly, the disk can spin up without stiction force while the head is away from the disk.

A problem with a stationary loading-unloading mechanism is the difficulty in aligning the loading-unloading mechanism to the disk within the tolerance permitted between the head and the disk. Alignment increases manufacturing costs and creates possible reliability problems because jarring of the disk drive can change the alignment. Another problem with stationary loading-unloading mechanisms is that when a head is loaded onto a disk after the disk is rotating, the head lands on the surface of the disk, near the outer edge of the disk. Often during landing, the head is not completely parallel with the surface of disk and can damage a landing zone on the disk. A disk drive can either waste disk area near the outer edge of the disk by not storing data in the landing zone or suffer from wear and data destruction which may result from head landings. Loading-unloading mechanisms are needed which do not waste or wear the premium track area at the outer edge of disk and which are easier to align.

SUMMARY OF THE INVENTION

An embodiment of a loading-unloading mechanism in accordance with the invention provides a ramp attached to an inner diameter of a disk and a head assembly with a suspension arm that engages the ramp to move a read/write head away from a surface of the disk. The head lands in a landing zone at an inner diameter of disk and does not damage data because the loading zone is not used for data storage. Alignment of the ramp with the disk is automatic because the ramp directly attaches to the disk.

One embodiment of the invention is a loading-unloading mechanism which includes: a ramp positioned adjacent a central portion of a disk; a head assembly which moves a head radially along the surface of the disk; and a suspension arm attached to the head assembly and positioned so that when the head is within a landing zone close to the center of the disk, the suspension arm engages the surface of the ramp and moves the head away from the surface of the disk. Typically, one such loading-unloading mechanism is provided for each disk surface which stores data.

Typically, the ramp is conical in shape and forms part of a spacer or disk clamp which attaches to a disk. To reduce frictional forces between the suspension arm and the ramp when the disk and ramp are rotating, the ramp can be lubricated, and/or an air foil can be added at the tip of the suspension arm to create and air cushion. The air foil can be made parallel to the inclined surface of the ramp so that when the suspension arm lifts the head, the head remains closer to parallel with the surface of the disk. Even without an air foil, making the portion of the suspension arm which engages the ramp, parallel to the inclined surface of the ramp keeps the head more parallel with the disk's surface and reduces damage during head landings.

An alternative embodiment of the invention, provides: a structure with a rounded surface positioned over a central portion of the disk; and a suspension arm attached to a head assembly and extending toward the structure with the rounded surface. A portion of the suspension arm is inclined relative to the surface of the disk. When the head is within a landing zone near the center of the disk, the inclined portion of the suspension arm engages the rounded surface and moves the head away from the surface of the disk. Typically, the structure with a rounded surface is a spacer or a disk clamp which attaches to the disk.

BRIEF DESCRIPTION OF THE DRAWINGS

Use of the same reference symbols in different figures indicates similar or identical items.

DETAILED DESCRIPTION OF THE PREFERRED EMBODIMENTS

Figure 1A:
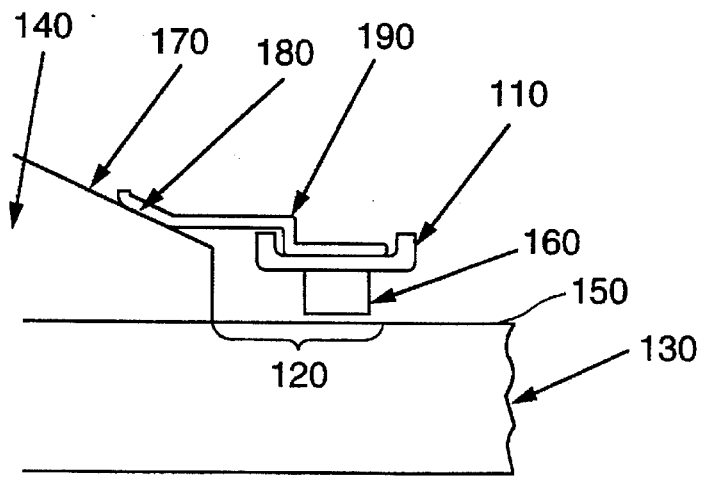
FIGS. 1A and 1B show a profile view and a top view of a loading-unloading mechanism in accordance with an embodiment of the invention.
Figure 1B:
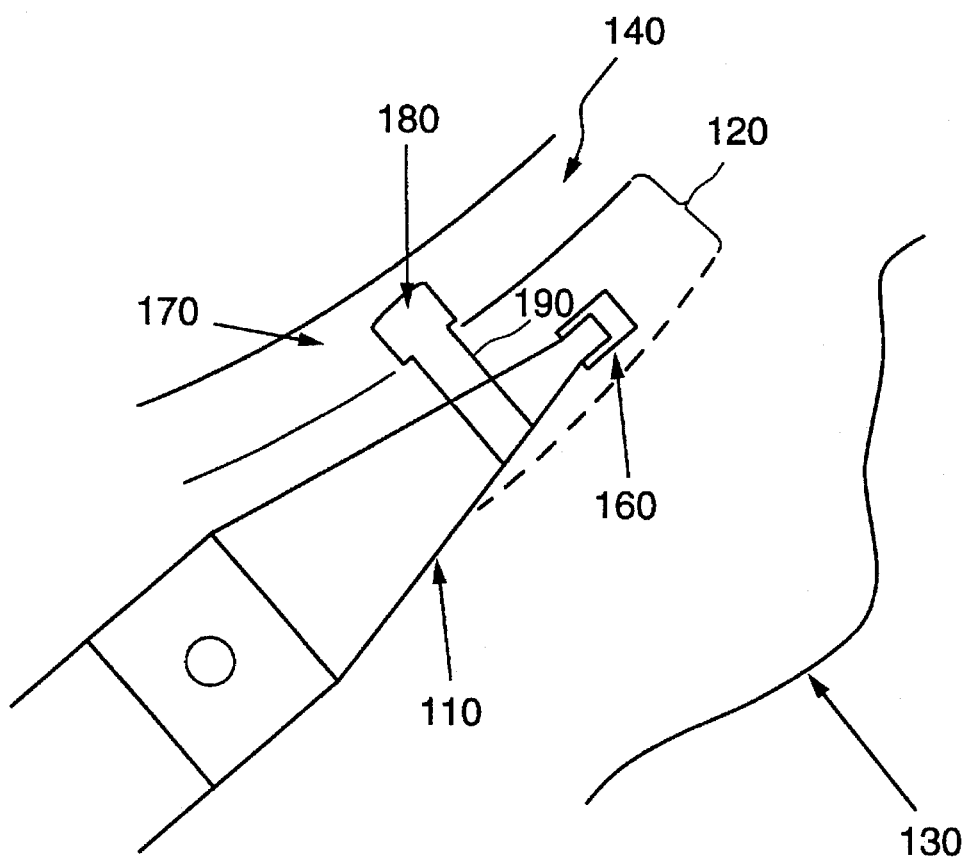

FIG. 1A and 1B show profile and top views of portions of a disk 130 and a head assembly 110. During reading and writing, a disk drive motor (not shown) rotates disk 130 relative to a read/write head 160. A loading-unloading mechanism near a central portion of disk 130 unloads head 160 by lifting head 160 away from a surface 150 of disk 130. This avoids stiction force and prevents collisions between head 160 and disk 130 caused by jarring of the disk drive. Head 160 is typically unloaded while stopping disk 130. When disk 130 is spinning, the loading-unloading mechanism loads head 160 on disk 130 by lowering head 160 to a position adjacent surface 150 in a landing zone 120.

Landing zone 120 is a central portion of disk 130. Tracks for data storage are typically not provided at small radii on a disk because such tracks have smaller storage capacity. In one embodiment of the invention, data is not stored in landing zone 120 because the radius of landing zone 120 is too small for efficient data storage. In another embodiment of the invention, data could be stored in landing zone 120 but is not. Contact between head 160 and surface 150 during landing of head 160 does not damage data because no data is stored in landing zone 120. Data capacity is lost by not storing data in an area which could efficiently store data, but landing zone 120 being near the center of disk 130 has a smaller area than an equal width zone at an outer edge of disk 130. Data can be stored on surface 150 out to the outer edge (not shown) of disk 130. Thus, the loss of data capacity for a landing zone at a small radius is less than the loss of data capacity for a landing zone at the outer diameter of the disk. In another embodiment of the invention, data is stored in landing zone 120. Rotational velocity of disk 130 in landing zone 120, being less than the velocity of tracks at the outer edge of disk 130, causes less damage when head 160 comes in contact with surface 150 than would be caused at the outer edge of disk 130.

The loading-unloading system of FIGS. 1A and 1B includes a ramp 140 which has a surface 170 inclined relative to surface 150, and a suspension arm 190 attached to head assembly 110 engages inclined surface 170 when head 160 enters landing zone 120. When an actuator moves head 160 radially toward the center of disk 130, the end of suspension arm 190 slides along inclined surface 170. Head assembly 110 flexes and allows head 160 to move away from surface 150. When the actuator moves head 160 away from the center of disk 130, suspension arm 180 follows inclined surface 170 and lowers head 160 onto surface 150. If the angle between inclined surface 170 and surface 150 is sufficiently shallow, an air film forms to cushion to the landing of head 160; but in accordance with an embodiment of this invention, the air film between head 160 and surface 150 is not required during landing.

In a typical application, inclined surface 170 is inclined between about 3° and 15° relative to surface 150. In some embodiments, inclined surface 170 is inclined between 5° and 7° relative to surface 150. The exact angle used depends on the application, but generally the angle used may be steeper than angles used in fixed ramps of convectional stationary loading-unloading mechanism because damage caused by head 160 landing on surface 150 is less than when a head at an outer diameter lands of a fast moving surface.

Ramp 140 is attached to, and rotates with disk 130. To reduce friction between suspension arm 190 and inclined surface 170, a self-acting air foil 180 is provided at the tip of suspension arm 190. Rotating disk 130 and ramp 140 creates an air cushion between air foil 180 and rotating inclined surface 170, which reduces friction and wear. Additionally, a lubricant such as perfluoropolyether diol, which is commonly employed in flying head disk drives, may be provided on inclined surface 170.

Figure 2:
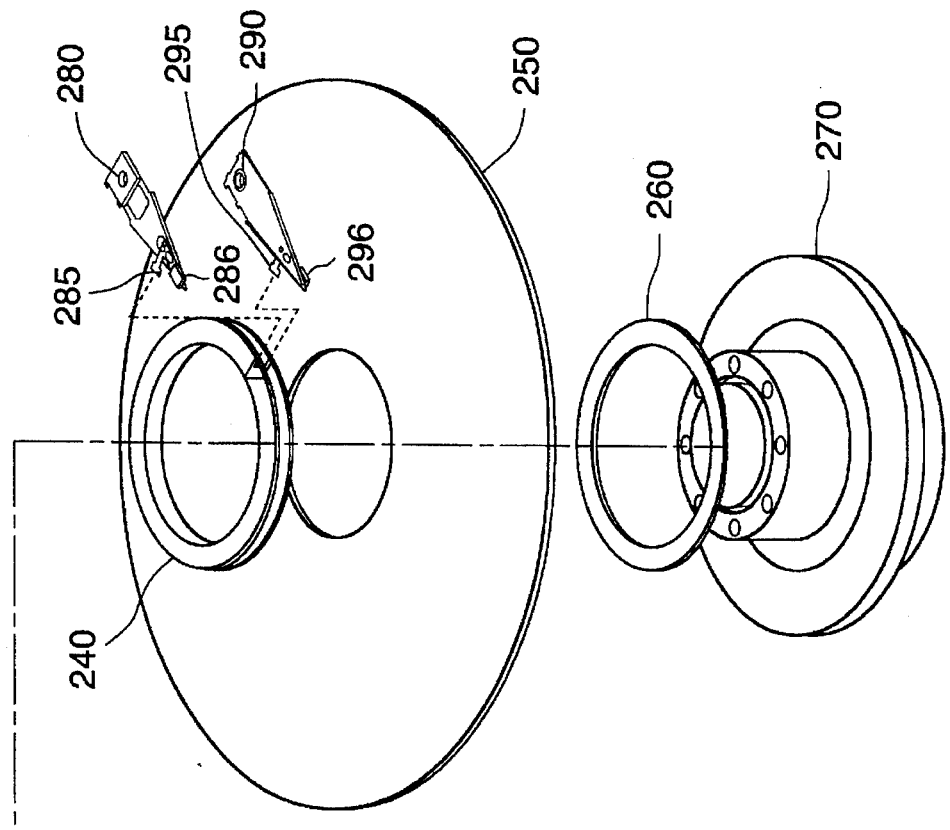
FIG. 2 shows a multidisk embodiment of a disk drive in accordance with the invention.
Figure 2:
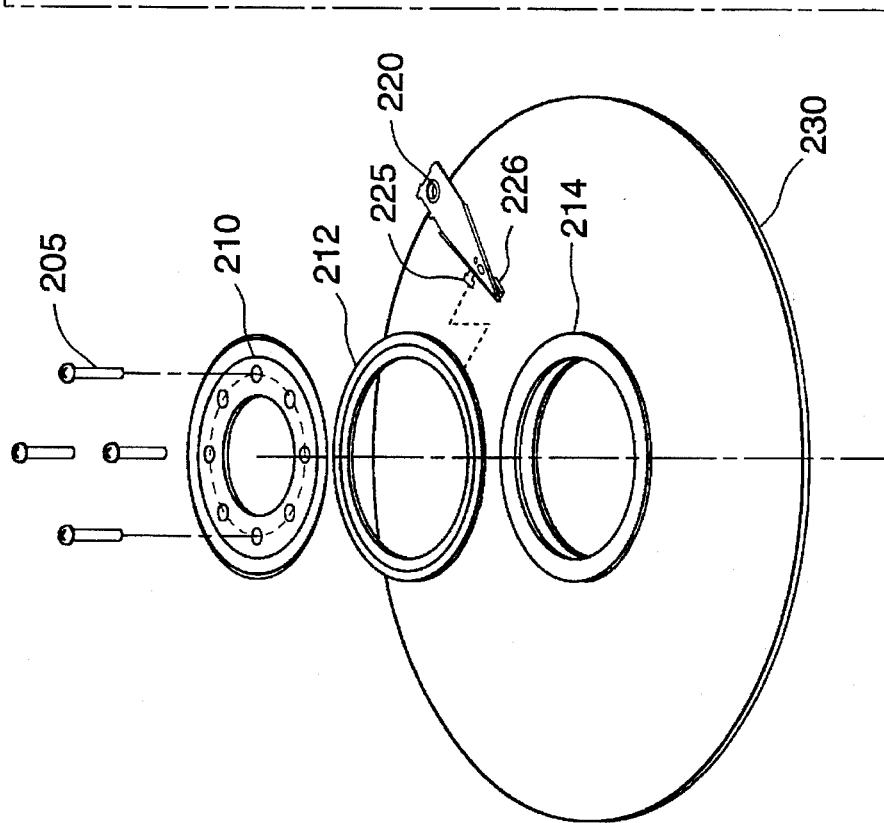

FIG. 2 shows an expanded view of an embodiment of the invention containing multiple disks 230 and 250 which are separated by spacers 240 and attached to a disk drive motor 270 by a disk clamp 210 and screws 205. Disk drive motor 270 is a conventional DC motor such as commonly employed in disk drives, and disk clamp 210 is a conventional spring clamp which attaches to a flange of disk drive motor 270 and applies pressure to a stack of disks 230 and 250. A spacer 212 and a damping spacer 214 are between disk clamp 210 and top disk 230. Damping spacer 214 is made of a material such as viscoelastic polymer, type 120 available from 3M, Inc. or another elastic material which serves to damp vibrations in disks 230 and 250.

Figure 3A:
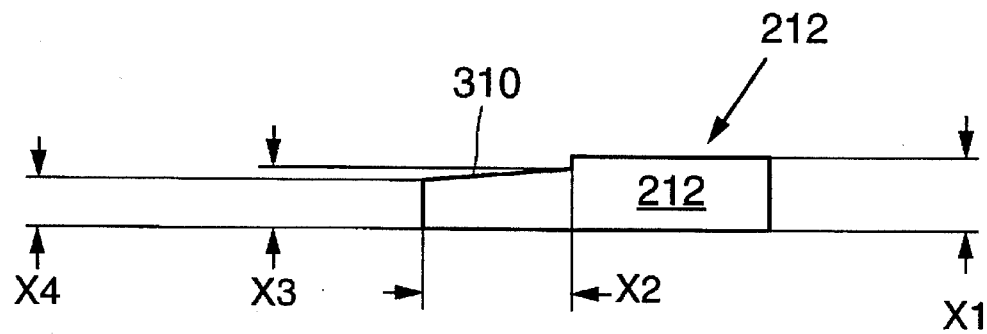
FIG. 3A and 3B show profile views of spacers used in the embodiment shown in FIG. 2.

Spacer 212 includes a ramp, such as ramp 140, as an integral part of spacer 212. FIG. 3A shows a cross-sectional view of an embodiment of spacer 212. In an exemplary embodiment, the dimensions X1, X2, X3, and X4 of spacer 212 are 0.808 mm, 1.616 mm, 0.762 mm, and 0.621 mm, respectively, and spacer 212 has inner and outer diameters of 25.05 mm and 36.60 mm. When the exemplary embodiment of spacer 212 is attached to disk 230, an inclined surface 310 on spacer 212 is at an angle of about 5° with the top surface of disk 230. Spacer 212 is made from a rigid material such as aluminum which is plated with nickel to provide a smooth and wear resistant surface.

In the embodiment of FIG. 2, inclined surface 310 is formed on spacer 212. Alternatively, disk clamp 210 could include an inclined surface which engages suspension arm 225, and spacer 212 can be omitted or replaced with a flat spacer. A head assembly 220 which moves a head 226, that reads and writes on the top surface of disk 230, has a suspension arm 225 which follows inclined surface 310 and moves head 226 away from disk 230 when head 226 moves toward spacer 212.

Figure 3B:
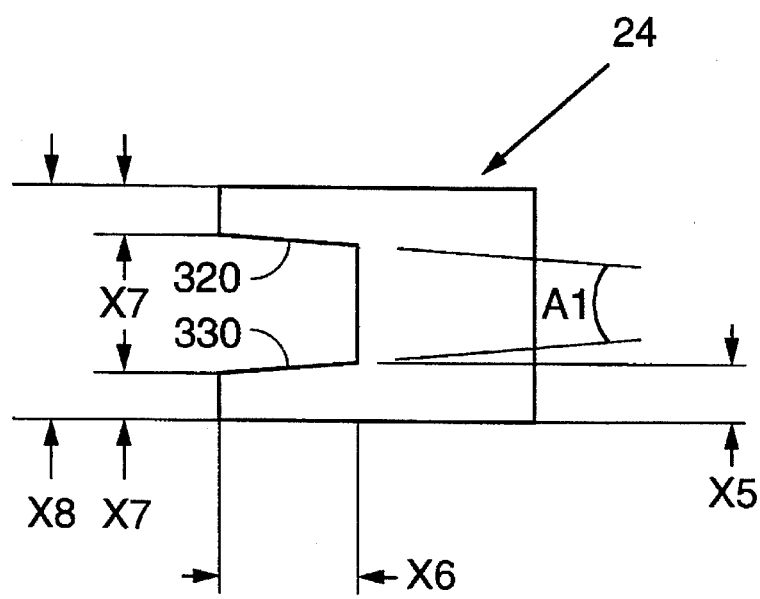

FIG. 3B shows a profile view of spacer 240 which is between disk 230 and disk 250. In the exemplary embodiment of the invention, spacer 240 has dimensions X5, X6, X7, and X8 equal to 0.762 mm, 1.616 mm, 0.621 mm, and 2.770 mm respectively. Inclined surfaces 320 and 330 of spacer 240 are at an angle A1 of about 10° with each other; and when assembled between disks 230 and 250, inclined surfaces 320 and 330 are at 5° angles with disks 230 and 250. The inner and outer diameters of spacer 240 are 25.00 mm and 32.60 mm, respectively. A head assembly 280 which moves a head 286, that reads and writes on the bottom surface of disk 230, has a suspension arm 285 which follows inclined surface 320 and moves head 286 away from disk 230 when head 286 moves toward spacer 240. A head assembly 290 which moves a head 296, that reads and writes on the top surface of disk 250, has a suspension arm 295 which follows inclined surface 330 and moves head 296 away from disk 250 when head 296 moves toward spacer 240.

Additional disks can be added to the embodiment of FIG. 2 by adding additional spacers identical to spacer 240 and additional head assemblies identical to head assemblies 280 and 290. A spacer 260 adjacent the bottom surface of the bottom disk 250 has an inclined surface similar to the inclined surface 310 of spacer 212. A suspension arm on a head assembly (not shown) holding the head which reads and writes on the bottom surface of disk 250 engages the inclined surface of spacer 260 to load and unload the head.

Disk clamp 210 and spacers 212, 240, and 260 in accordance with this invention replace disk clamps and spacers normally used in conventional disk drives. Accordingly, addition of the loading-unloading mechanism does not increase the number of parts. Alignment of inclined surfaces on spacers 212, 240, and 260 is automatic because spacers 212, 240, and 260 attach to disks 230 and 250 which aligns the angle and position of the inclined surfaces to the accuracy of the shape of spacers 212, 240, and 260. In contrast, some ramps mounted separately from disks require special parts and must be precisely aligned with the disks to provide accurate landing of the head.

Figure 4A:
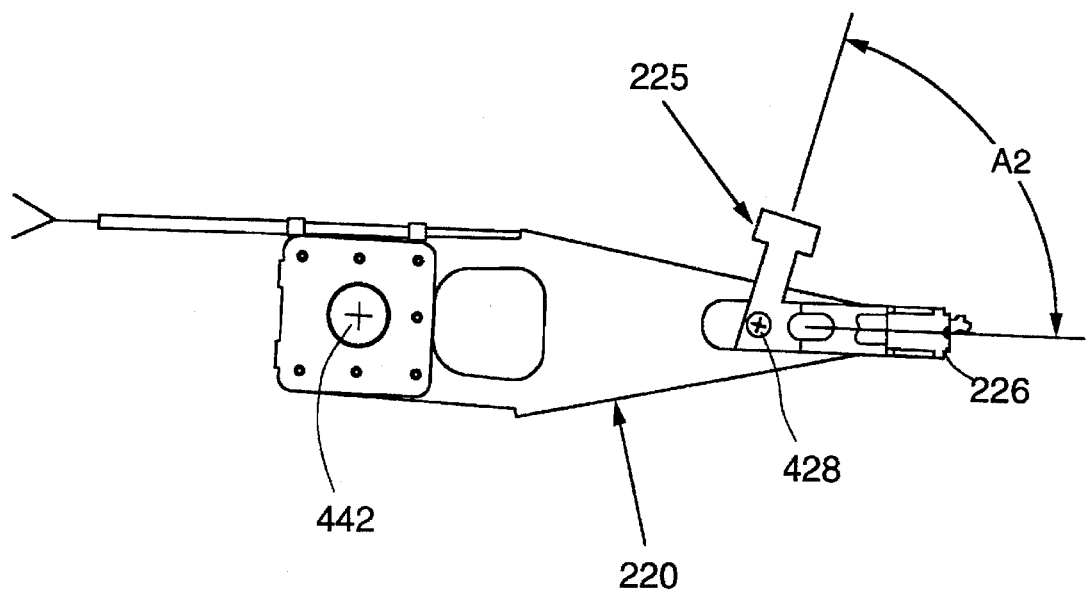
FIGS. 4A and 4B show a bottom view and a side view of a head assembly used in the embodiment of FIG. 2.
Figure 4B:
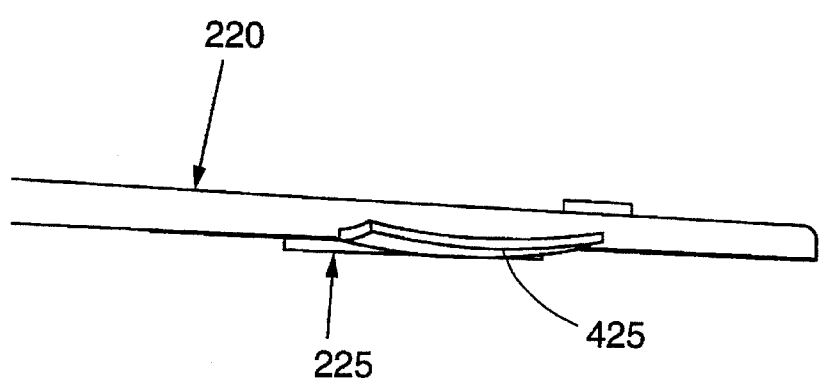

FIGS. 4A and 4B show a bottom view and an expanded profile view of head assembly 220. Head assembly 290 is identical to head assembly 220, and head assembly 280 is mirror symmetric to head assembly 220. As shown in FIG. 4A, suspension arm 225 is at an angle A2 of 75.2° relative to an axis through head 226 and a pivot point 422.

As shown in FIG. 4B, the end of suspension arm 225 is curved to form a spoon shape which creates an air foil 425 and causes an air cushion between suspension arm 225 and inclined surface 310 when spacer 212 is rotating. In the exemplary embodiment, air foil 425 is curved as part of a spherical surface having radius of curvature of 6.35 mm.

Figure 5:
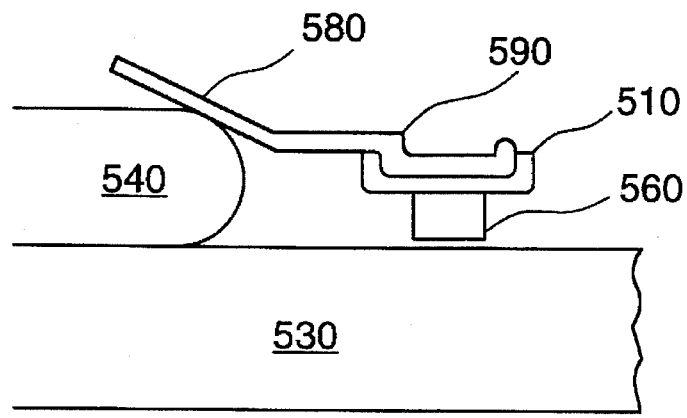
FIG. 5 shows an embodiment of a head ramp and spacer in accordance with the invention.

FIG. 5 shows an alternative loading-unloading mechanism in which a spacer 540 attached to a central portion of a disk 530 has a curved surface, and a suspension arm 590 which is attached to a head assembly 510 has an inclined surface 580. When suspension arm 590 is move toward spacer 540, inclined surface 580 engages the curved surface of spacer 540 and moves a read/write head 560 away from disk 530.

Figure 6:
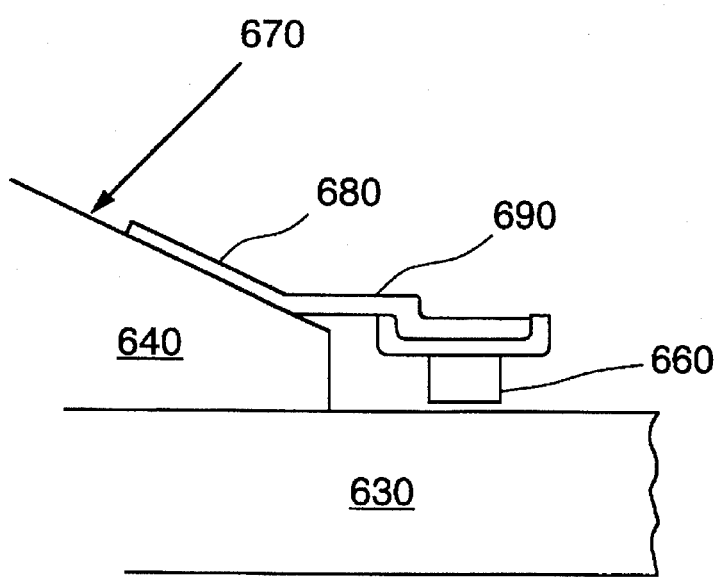
FIG. 6 shows another embodiment of a head ramp and spacer in accordance with the invention.

FIG. 6 shows yet another embodiment of a loading-unloading mechanism. A suspension arm 690 has an inclined surface 680 which engages an inclined surface 670 of a ramp 640 attached to a disk 630. The two inclined surface 670 and 680 co-operate to load and unload a read/write head 660. An advantage of this embodiment is that loading-unloading mechanism keeps the surface of head 660 more parallel to the surface of disk 630.

Although the present invention has been described with reference to particular embodiments, the description is only an example of the invention's application and should not be taken as a limitation. For example, although described embodiments of the invention include suspension arms which engage structures attached to a disk, a suspension arm could alternatively engage a fixed structure provided near an inner diameter of a disk. Such fixed structures would not have the automatic alignment provided by attaching a ramp to a disk, but would provide the benefits of a landing zone at an inner diameter of the disk. Various other adaptations and combinations of features of the embodiments disclosed are within the scope of the present invention as defined by the following claims.

We claim:

1. A disk drive comprising:

a disk having a surface adapted for storage of data;

a ramp attached to a central portion of the disk, the ramp having a surface inclined relative to the surface of the disk, wherein the inclined surface of the ramp is a portion of a surface which has a symmetry axis coincident with an axis about which the disk and the ramp rotate;

a head assembly adapted to move a head radially along the surface of the disk; and a suspension arm attached to the head assembly so that when the head is within a landing zone around the central portion of the disk, the suspension arm engages the surface of the ramp and moves the head away from the surface of the disk.

2. The disk drive of claim 1, wherein the inclined surface of the suspension arm is parallel to the inclined surface of the ramp.

3. The disk drive of claim 2, wherein the suspension arm further comprises an air foil at a tip of the suspension arm, and the air foil engages the surface of the ramp when the head is within the landing zone.

4. The disk drive of claim 3, wherein the air foil is inclined at an angle relative to the surface of the disk.

5. The disk drive of claim 4, wherein the air foil is parallel to the inclined surface of the ramp.

6. The disk drive of claim 3, further comprising a lubricant on the surface of the ramp.

7. The disk drive of claim 2, wherein the ramp, the disk, and the head assembly are the first ramp, the first disk, and the first head assembly in the disk drive, and the disk drive further comprises:

a second disk having a surface adapted for storage of data;

a second ramp attached to a central portion of the second disk, the second ramp having a surface inclined relative to the surface of the second disk;

a second head assembly adapted to move a second head radially along the surface of the second disk; and a second suspension arm attached to the second head assembly so that when the second head is within a second landing zone on the second disk, the second suspension arm engages the surface of the second ramp and moves the second head away from the surface of the second disk.

8. The disk drive of claim 7, wherein the first and second ramps are part of a spacer which separates the first disk from the second disk.

9. The disk drive of claim 2, wherein the surface of the ramp is inclined between 5° and 7° degrees relative to the surface of the disk.

10. The disk drive of claim 1, wherein no data storage is provided on the surface of the disk within the landing zone.

11. The disk drive of claim 1, wherein the suspension arm further comprises an inclined surface which engages the inclined surface of the ramp when the head is within the landing zone.

12. A disk drive comprising:

a disk having a surface adapted for storage of data;

a structure which has a rounded surface and is attached to a central portion of the disk, wherein the disk and the structure rotate together as a unit;

a head assembly adapted to move a head radially along the surface of the disk; and a suspension arm attached to the head assembly and extending toward the structure with the rounded surface, the suspension arm having a portion that is inclined relative to the surface of the disk so that when the head is within a landing zone around a center of the disk, the suspension arm engages the rounded surface and moves the head away from the surface of the disk.

13. The disk drive of claim 12, wherein the structure comprises a spacer attached to a central portion of the disk.

14. A disk drive comprising:

a first disk having a surface adapted for storage of data;

a second disk having a surface adapted for storage of data;

a spacer which separates the first disk from the second disk, the spacer having a first surface and a second surface;

a first head assembly adapted to move a first head radially along the surface of the first disk;

a first suspension arm attached to the first head assembly so that when the first head is within a first landing zone around a central portion of the first disk, the first suspension arm engages the first surface of the spacer and moves the first head away from the surface of the first disk;

a second head assembly adapted to move a second head radially along the surface of the second disk;

a second suspension arm attached to the second head assembly so that when the second head is within a landing zone around a central portion of the second disk, the second suspension arm engages the second surface of the spacer and moves the second head away from the surface of the second disk.

15. The disk drive of claim 14, wherein the first surface comprises a first ramp inclined relative to the surface of the first disk, and the second surface comprises a second ramp inclined relative to the surface of the second disk.

16. The disk drive of claim 14, wherein the first and second surfaces comprise rounded portions of the spacer.

17. The disk drive of claim 14, wherein the first head assembly is coupled to the second head assembly so that the first and second head assemblies move in unison.

* * * * *